United States Patent
Wang et al.

(10) Patent No.: US 6,340,966 B1
(45) Date of Patent: Jan. 22, 2002

(54) CLAMPING DEVICE FOR THIRD-AXIS INPUT DEVICE OF MOUSE

(76) Inventors: Ching-Shun Wang, 2F, No. 550, Min Tsu E. Rd., Taipei; Cheng-Liang Hsieh, 7F, No. 142-1, Lane 108, Sec. 1, Kuang Fu Rd., E. Dist., Hsin Chu; Hsin Te Tseng, 4F, No. 19, Shin-Chien St., Pei-Tou, Taipei, all of (TW)

( * ) Notice: Subject to any disclaimer, the term of this patent is extended or adjusted under 35 U.S.C. 154(b) by 0 days.

(21) Appl. No.: 09/492,040

(22) Filed: Jan. 27, 2000

(51) Int. Cl.[7] .................................................. G09G 5/00
(52) U.S. Cl. .................... 345/163; 345/156; 345/164; 345/166; 200/5 EA; 200/11 B; 200/43.11; 200/220; 273/142 R; 463/37; 463/47
(58) Field of Search ................................. 345/163, 156, 345/164, 166; 200/5 EA, 11 B, 43.11, 220; 273/142 R; 463/37, 47

(56) References Cited

U.S. PATENT DOCUMENTS

| | | | |
|---|---|---|---|
| 5,808,568 A | * | 9/1998 | Wu .............................. 341/20 |
| 5,912,661 A | * | 6/1999 | Siddiqui ..................... 345/166 |
| 6,014,130 A | * | 1/2000 | Yung-Chou ................. 345/163 |
| 6,166,721 A | * | 12/2000 | Kuroiwa et al. ............ 345/163 |
| 6,188,389 B1 | * | 2/2001 | Yen ............................. 345/163 |
| 6,188,393 B1 | * | 2/2001 | Shu ............................. 345/184 |
| 6,285,355 B1 | * | 9/2001 | Chang ......................... 345/163 |

* cited by examiner

Primary Examiner—Richard Hjerpe
Assistant Examiner—Henry N. Tran
(74) Attorney, Agent, or Firm—Rosenberg, Klein & Lee

(57) ABSTRACT

An improved clamping device for third-axis input device of mouse, comprises a hollow roller stage and a roller with a plurality positioning holes and pivotally arranged on the roller stage. The roller exposes out of the cover of the mouse. The roller stage has two pivot rods on front side thereof and pivotally engaged with two pivot holes on front side of the base plate of the mouse. The roller stage has a pair of locking plates extended from each of both sides thereof and a locking groove is formed between one pair of locking plates. The pivotal rod of the roller is engaged within one locking groove. A clamping device is provided at lower lateral side of the groove. The clamping device comprises at least one ball mount on the lateral side; a through hole on the sidewall of the ball mount; a rolling ball mounted on the through hole with partially exposed portion; at least one blocking flange on outer sides of the lateral side; a block plate locked by the blocking flange and used to retain the rolling ball such that the rolling ball is positioned within one positioning hole to confine the rotation of the roller.

5 Claims, 9 Drawing Sheets

CLAMPING DEVICE FOR THIRD-AXIS INPUT DEVICE OF MOUSE

FIELD OF THE INVENTION

The present invention relates to an improved clamping device for third-axis input device of mouse, especially to a clamping device for roller of third-axis input device of mouse and generating click sound.

BACKGROUND OF THE INVENTION

As shown in FIGS. 1 to 3, the conventional third-axis input device 20 of mouse 10 is arranged for providing scrolling function. The mouse 10 comprises at least a base 101, a cover 102, a circuit board 103, a left button and a right button, all are well known art.

The third-axis input device 20 comprises a hollow case 1 located at a dent 104 arranged in front of the circuit board 103 and pivotally arranged at the base 101 of the mouse 10. The case 1 has two pivotal plates 11 on both sides thereof and having a through hole 12. The base 101 has poles 105 corresponding to the pivotal plates 11, an elastic member 106 (for example, spring) on each pole 105. The through hole 12 is hooked on top of the pole 105 and lays against the elastic member 106.

The case 1 has two retaining grooves 13 and 14 extended on two other sides thereof and a pivot rod 15 on one side thereof corresponding to a micro-switch 107.

A roller 2 is pivotally arranged within the hollow case 1. A lengthwise opening 108 is provided on the cover 102 and equal distance to the left and right buttons such that an operative portion of the roller 2 exposes out of the mouse 10 from the lengthwise opening 108.

The roller 2 has a closed lateral side and a pivot rod 21 on the lateral sides thereof and pivotally engaged with the retaining groove 13 such that the roller 2 is retained within the case 1. The roller 2 has a plurality of positioning holes 22 on the closed lateral side. The case 1 has a positioning pole 16 corresponding to the roller 2. The roller 2 has an opened lateral side and has an accommodating space 23 therein and containing a driving wheel 24 of a wheel set.

An optical means 3 is arranged within the accommodating space 23 and has a hollow housing 31, which has a clamping plate 32 on the lateral side not facing the accommodating space 23. The clamping plate 32 is engaged within the retaining groove 14. The hollow housing 31 has a cover plate 39 on the lateral side facing the accommodating space 23. A driven wheel 33 is provided to engage with the driving wheel 24 when the roller 2 rotates. The driven wheel 33 is embedded into the embedding groove 34 of the cover plate 39 through a link 331, and connected to a wheel cover 35 and an encoder wheel 36 within the housing 31. An infrared transceiver 37 is arranged at a position corresponding to the encoder wheel 36 and electrically connected to a circuit board 38, which is electrically connected to the circuit board 103 of the mouse 10.

When user rotates the roller 2, the driving wheel 24 drives the driven wheel 33 and the encoder wheel 36 is rotated accordingly. The transceiver 37 sends signal to the circuit board 38 and then to the primary circuit board 103 of the mouse 10. When user presses the roller 2, the pivot rod 15 is pressed to touch the micro switch 107 and activate the third axis input function. The case 1 lays against the pole 105 hooked by the elastic member 106, which generates a rebound force for the roller 2 and buffer the pressing force of the roller 2. When the roller 2 is not rotated, the positioning pole 16 is located within the positioning holes 22 such that the roller 2 is retained.

However, the housing 31 of the mouse is floated and supported by elastic member, the assembling thereof is cumbersome and stability is hard to ensure. The provision of positioning pole 16 makes the manufacture of mouse difficult.

It is an object of the invention to provide an improved clamping device for third-axis input device of mouse, wherein the roller stage and the underlying base plate can be easily clamped.

It is another object of the invention to provide an improved clamping device for third-axis input device of mouse, wherein at least one rolling ball is provided on the roller stage to clamp the roller. Therefore, the tactile feeling is enhanced and the third-axis operation is more precise.

To achieve above objects, the present invention provides an improved clamping device for third-axis input device of mouse, which comprises a hollow roller and a roller with a plurality positioning holes and pivotally arranged on the roller stage and exposed out of the cover of the mouse. The roller stage has two pivot rods on front side thereof and pivotally engaged with two pivot holes on front side of the base plate of the mouse. The roller stage has a pair of locking plates extended from each of both sides thereof and a locking groove is formed between one pair of locking plates. The pivotal rod of the roller is engaged within one locking groove. A clamping device is provided at lower lateral side of the groove. The clamping device comprises at least one ball mount on the lateral side; a through hole on the sidewall of the ball mount; a rolling ball mounted on the through hole with partially exposed portion; at least one blocking flange on outer sides of the lateral side; a block plate locked by the blocking flange and used to retain the rolling ball such that the rolling ball is positioned within one positioning hole to confine the rotation of the roller.

The various objects and advantages of the present invention will be more readily understood from the following detailed description when read in conjunction with the appended drawing, in which:

DETAILED DESCRIPTION OF THE PREFERRED EMBODIMENT

Figure 1:
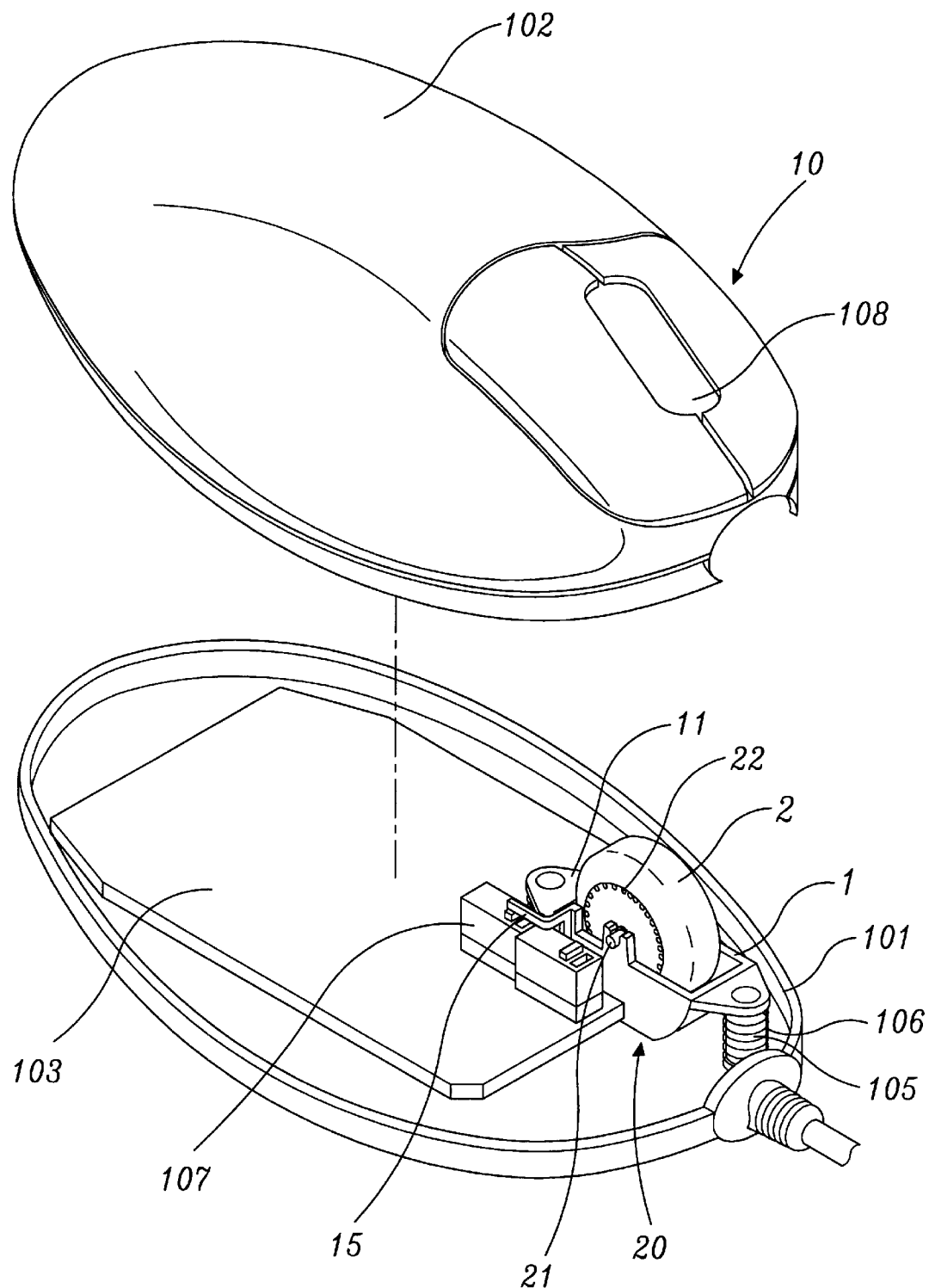
FIG. 1 is an exploded view of a prior art mouse.
Figure 2:
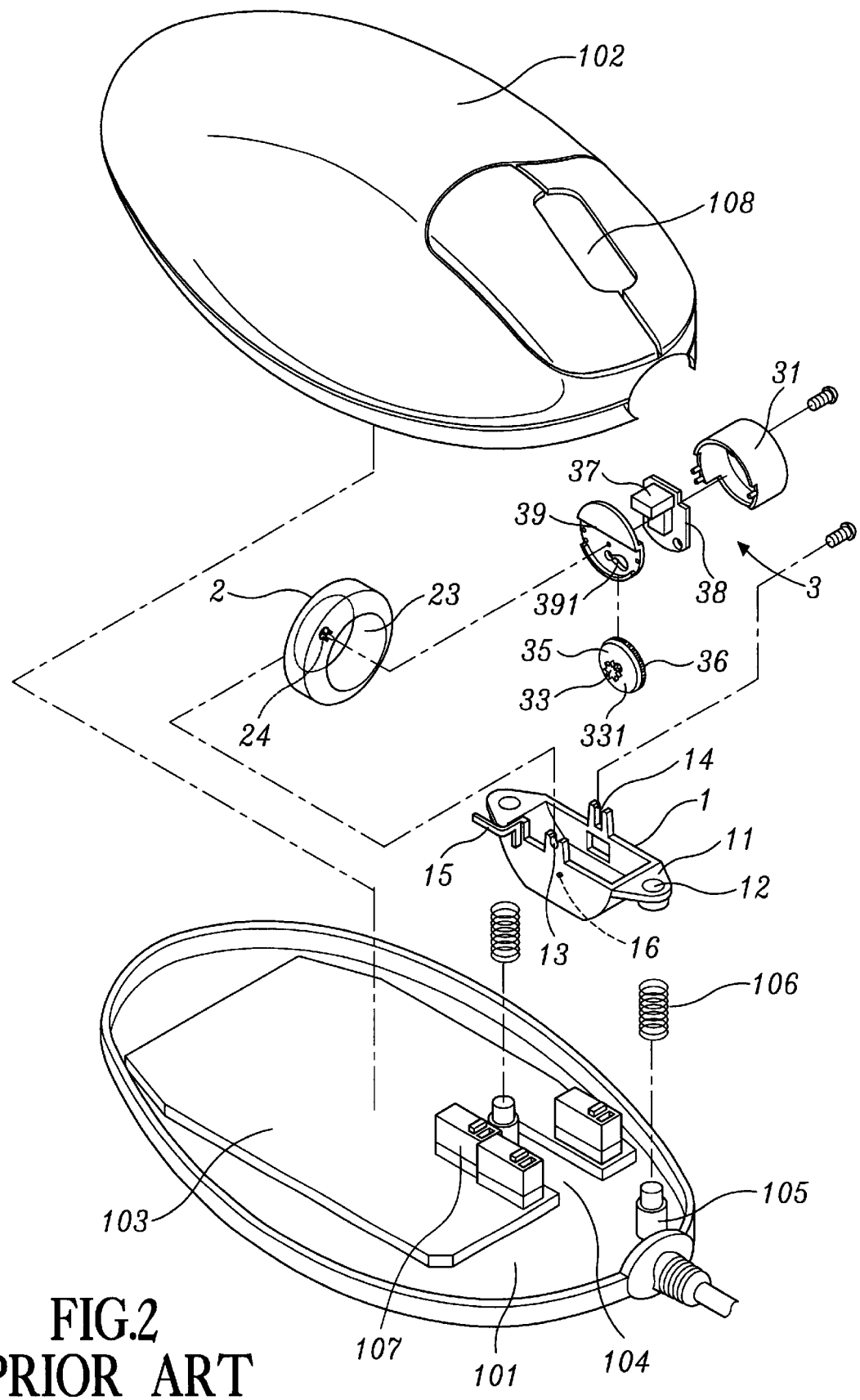
FIG. 2 is another exploded view of a prior art mouse with partial components being assembled.
Figure 3:
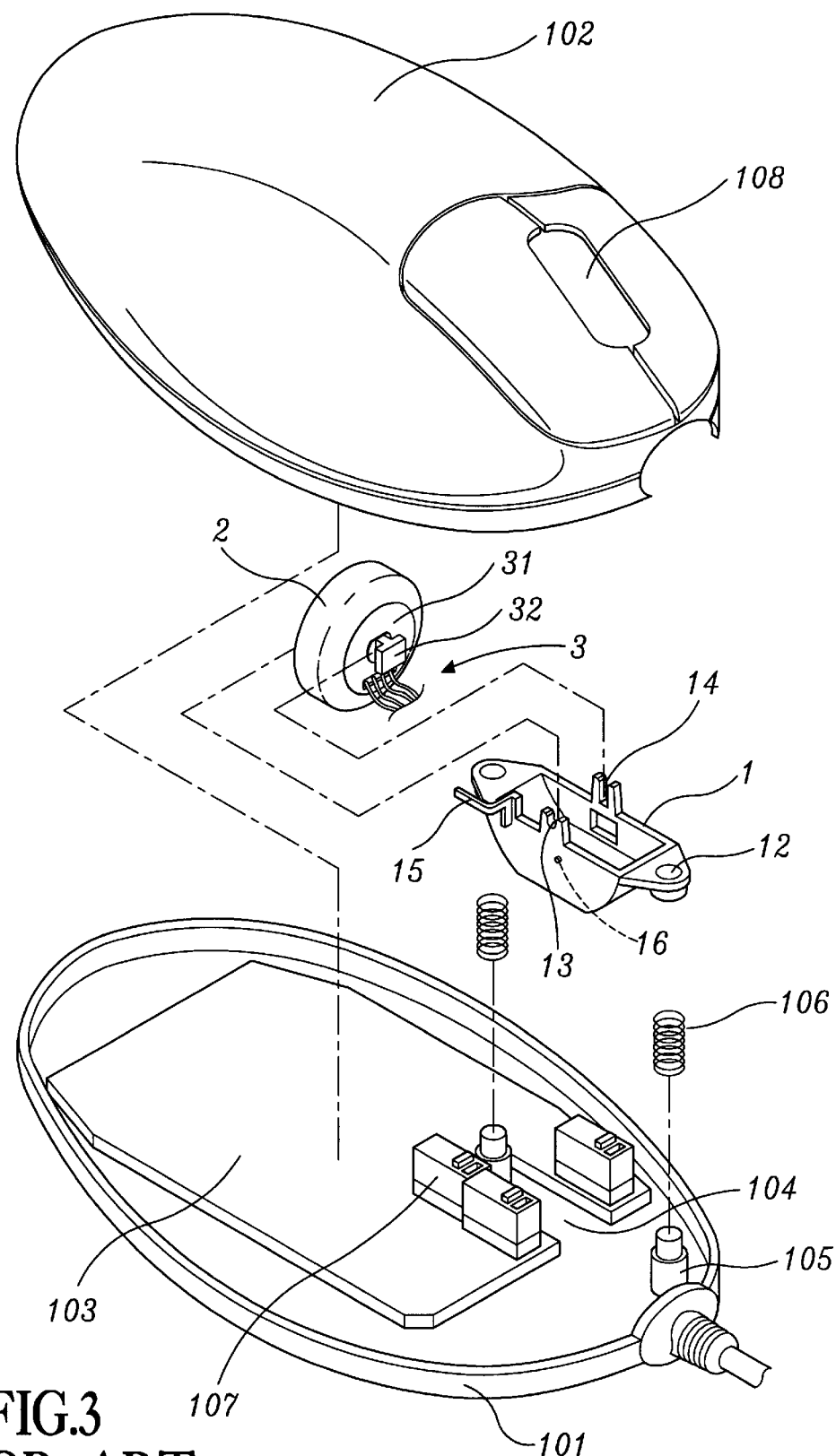
FIG. 3 is another exploded view of a prior art mouse with more components being assembled.
Figure 4:
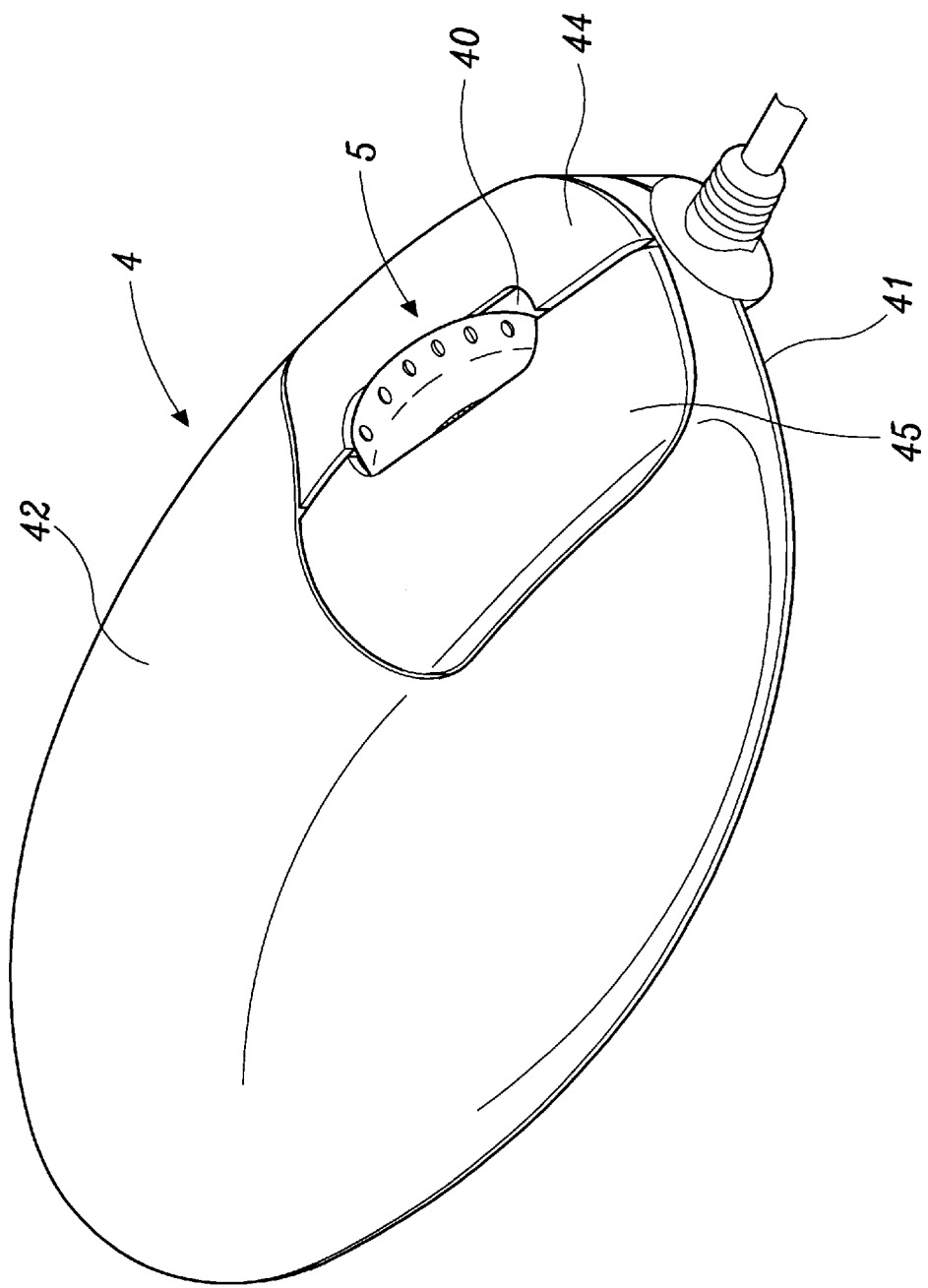
FIG. 4 is the perspective view of mouse according to the present invention.
Figure 5:
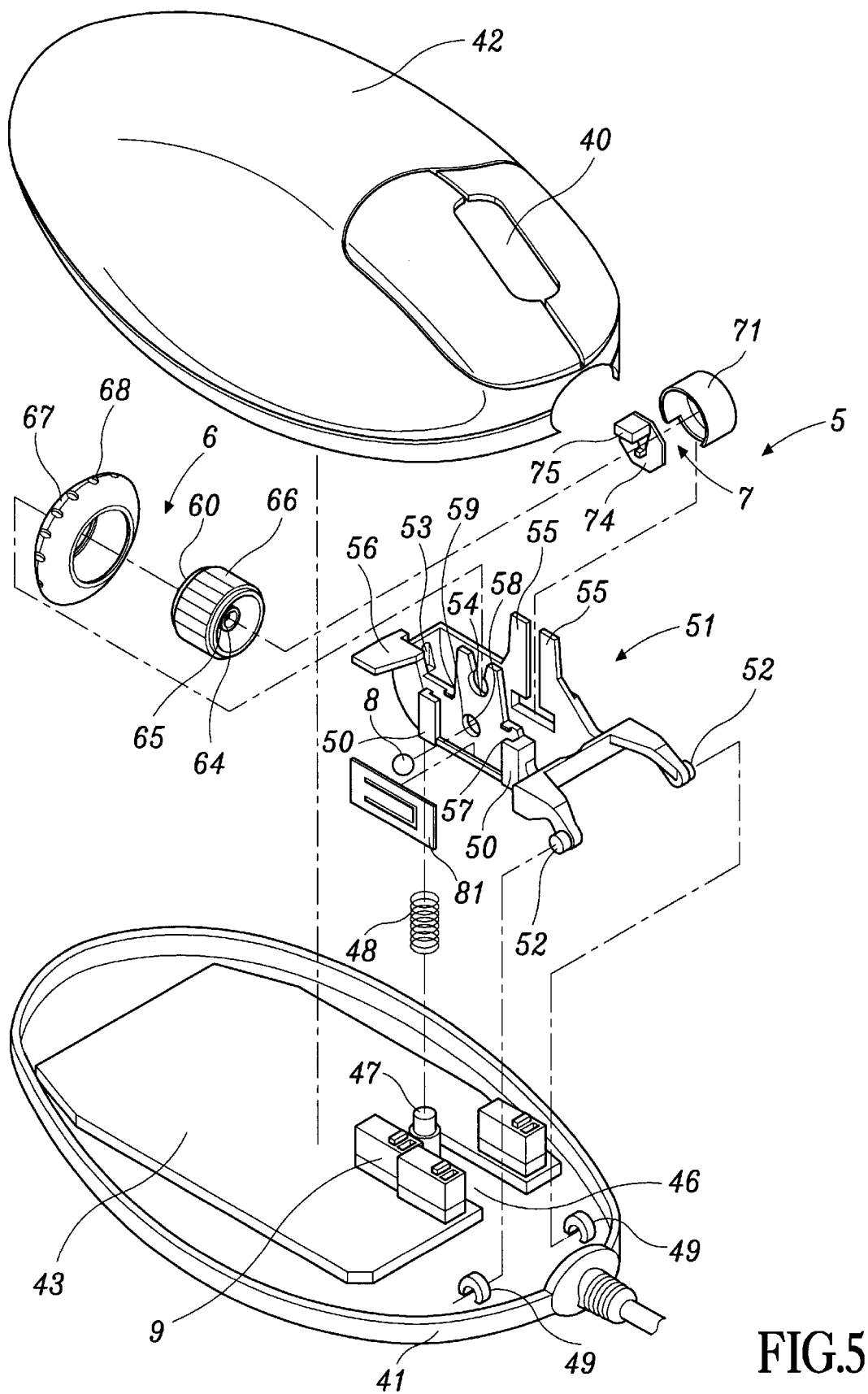
FIG. 5 is an exploded view of mouse according to the present invention.
Figure 6:
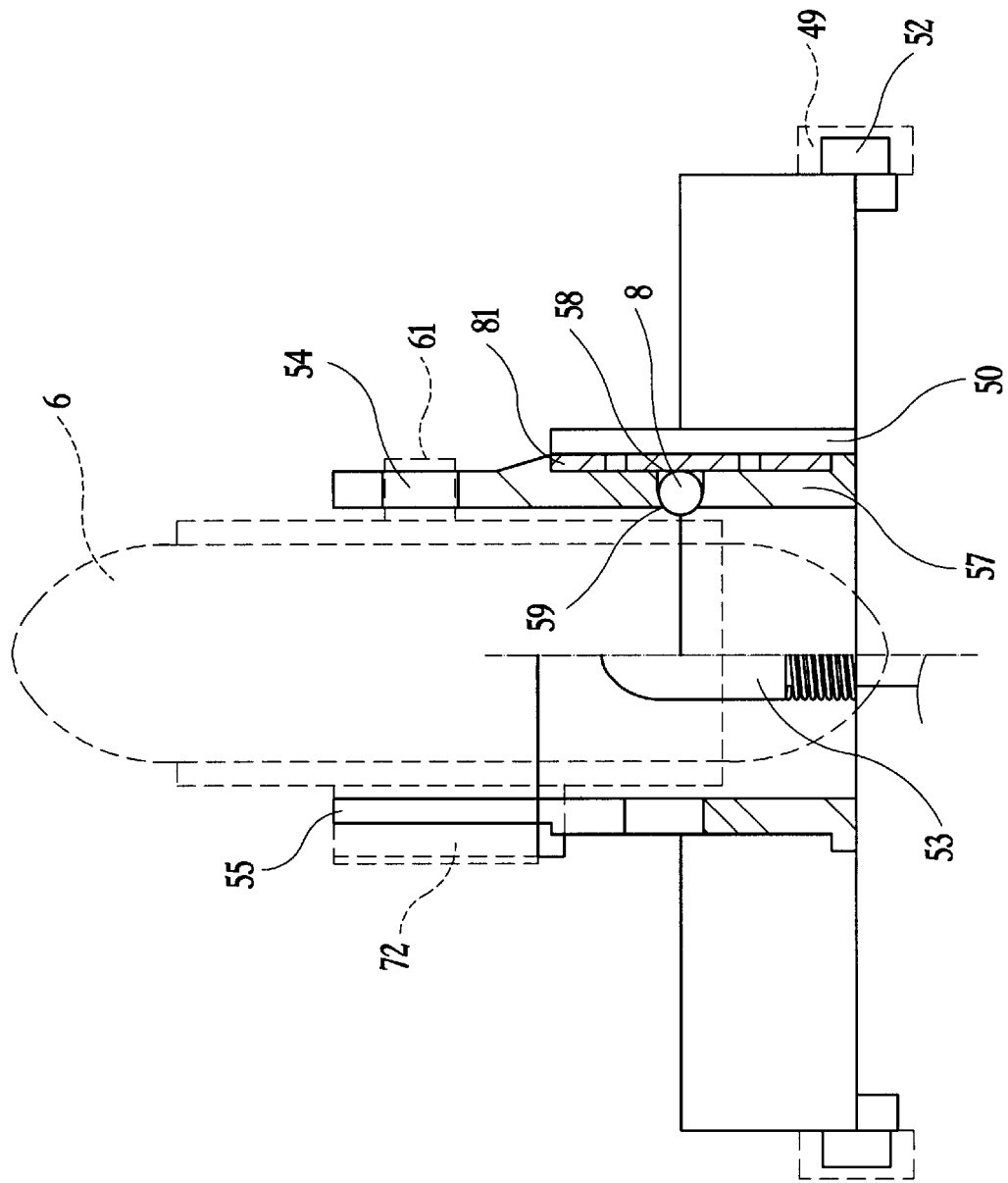
FIG. 6 is the sectional view of the roller stage according to the present invention.
Figure 7:
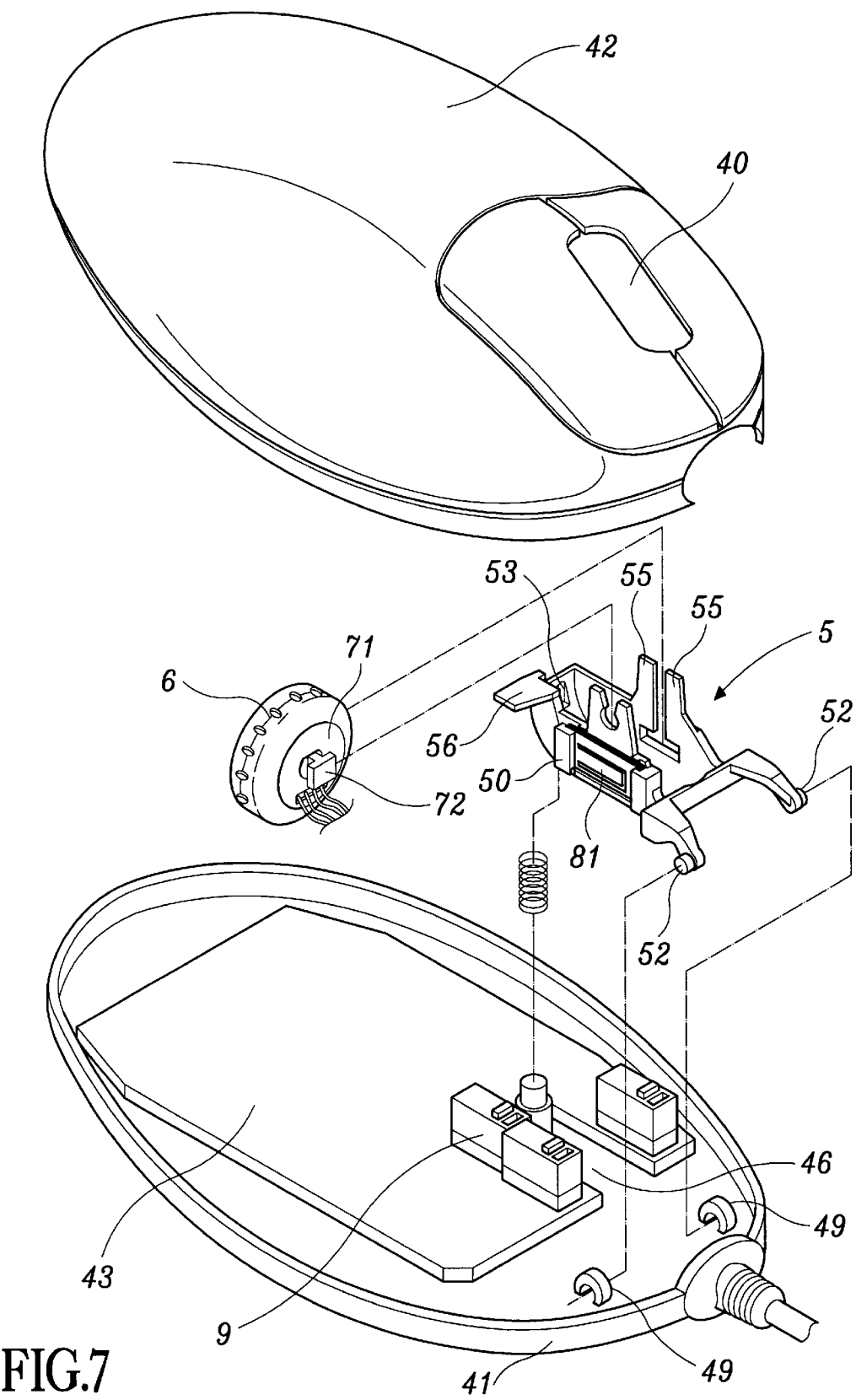
FIG. 7 is another exploded view of mouse according to the present invention with partial components being assembled.
Figure 8:
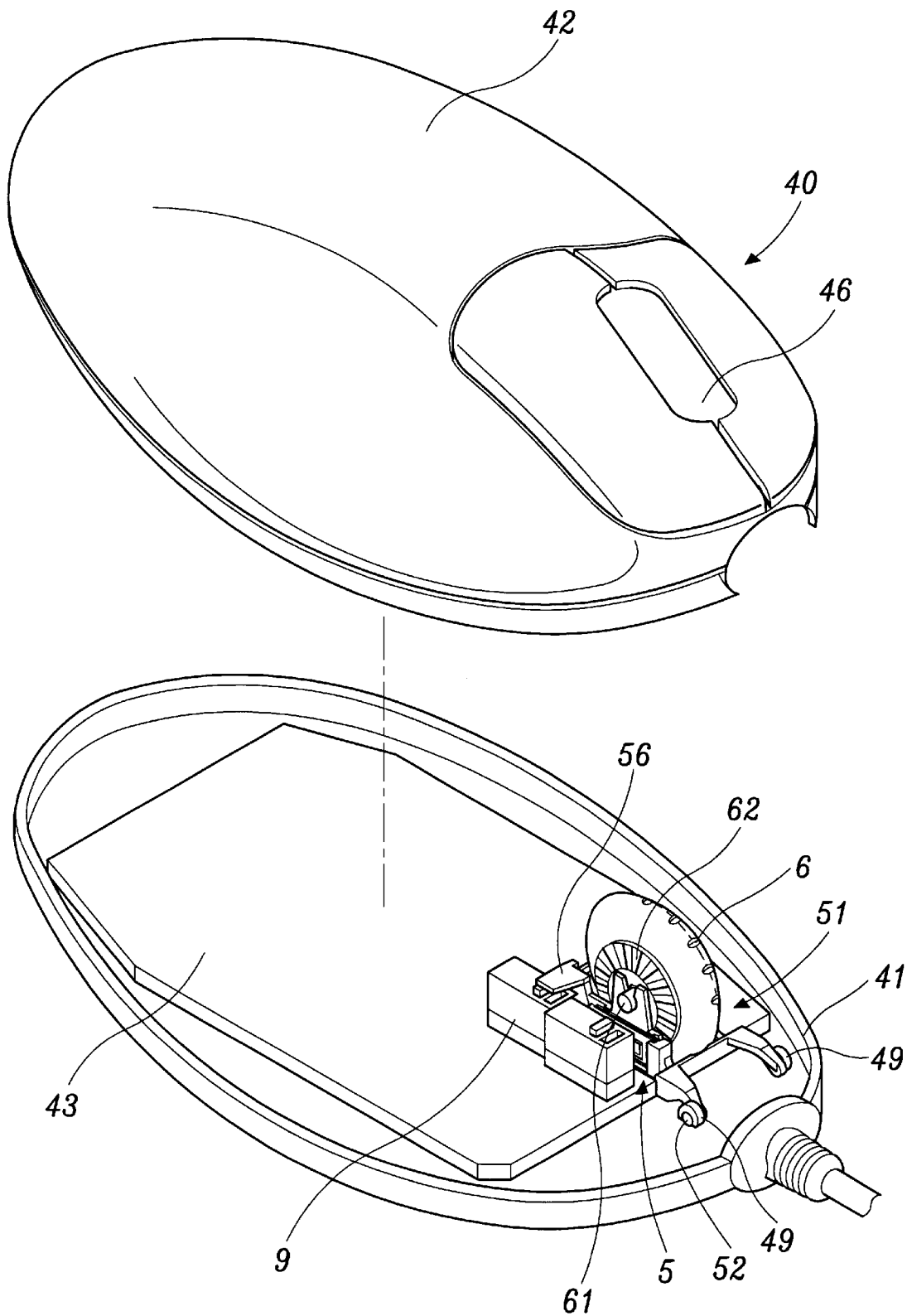
FIG. 8 shows the perspective view of the roller and roller stage according to a preferred embodiment of the present invention.
Figure 9:
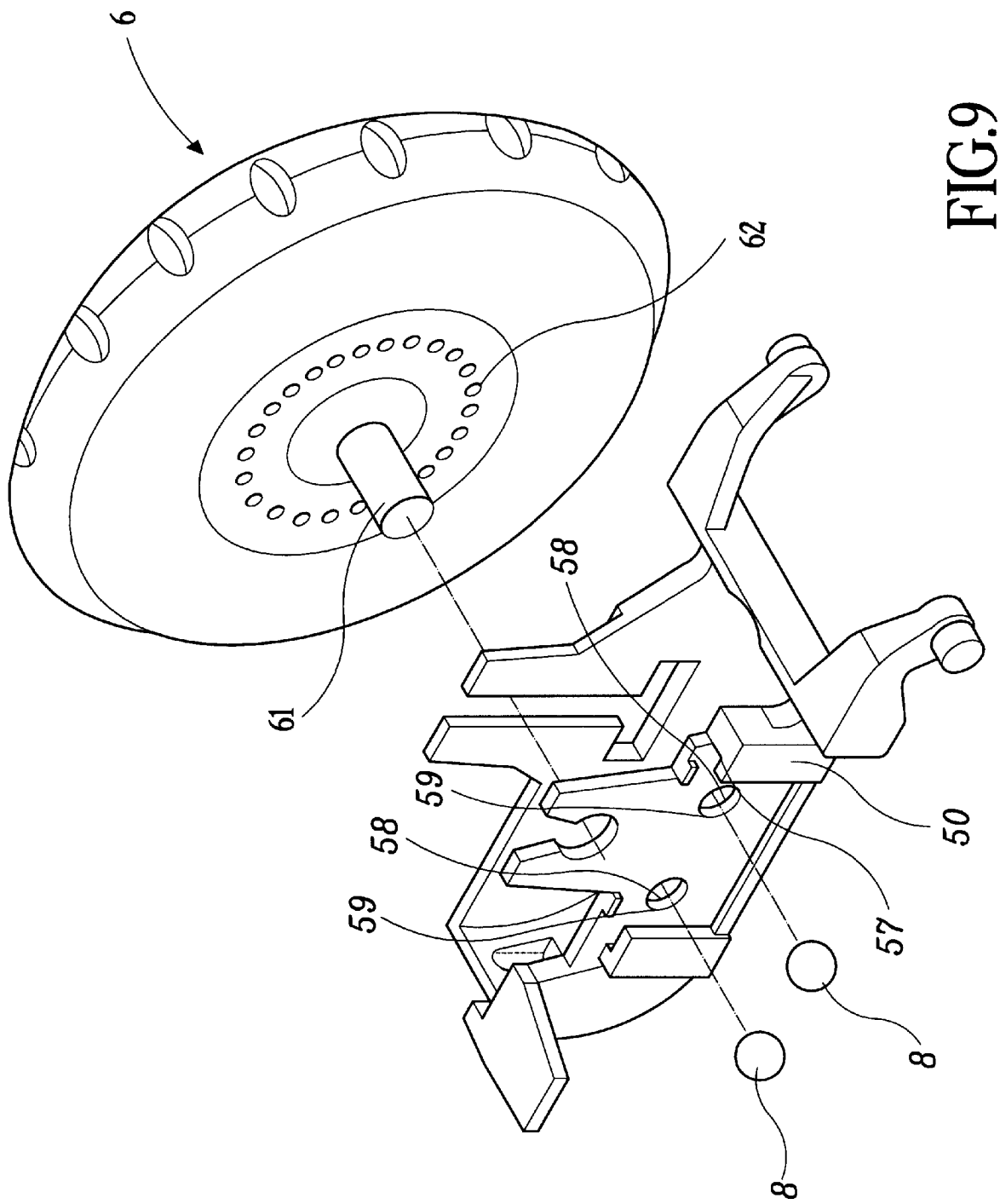
FIG. 9 shows the perspective view of the roller and roller stage according to another preferred embodiment of the present invention.

With reference now to FIGS. 4 to 7, the present invention provides an improved clamping device for third-axis input device of mouse, wherein the mouse 4 is added with a third-axis (z-axis) input device 5 to provide the mouse 4 with scroll function. Therefore, the screen of computer can be easily scrolled up and down without moving the mouse. This kind of mouse 4 comprises a base plate 41, a cover 42, a primary circuit board 43, a left button 44 and a right button 45. Those are well known art and the detailed description thereof is omitted here for clarity.

The third-axis input device 5 has a hollow roller stage 51 located at a dent 46 arranged in front of the primary circuit board 43. The hollow roller stage 51 has two pivot rods 52 on front side thereof and pivotally engaged with two pivot holes 49 on front side of the base plate 41. The hollow roller stage 51 has arc-shape front end to adapt with the shape of mouse and accommodate the two pivot holes 49. The roller stage 51 has a downward extended fixing unit 53 fitted with a pole 47 extended on the rear end of the base plate 41. An elastic member 48 (such as spring) is arranged between the downward extended fixing unit 53 and the pole 47 such that the roller stage 51 is rotated with the front end thereof as a pivot.

The roller stage 51 has a pair of locking plates 55 extended from each of both sides thereof and a locking groove 54 on one pair of locking plates 55. The roller stage 51 further has a pivot shaft 56 on rear side of the locking groove 54 and corresponding to a micro switch 9 on the primary circuit board 43.

A roller 6 is pivotally arranged within the hollow roller stage 51. A lengthwise opening 40 is provided on the cover 42 and equal distance to the left and right buttons such that an operative portion of the roller 6 exposes out of the mouse from the lengthwise opening 40.

The roller 6 has a closed lateral surface 60 and a locking pole 61 on the closed lateral surface 60 and engaged within the locking groove 54 on one side of the roller stage 51 such that one end of the roller 6 is retained on the roller stage 51. The outer part of the closed lateral surface 60 is provided with a plurality of positioning holes 62 arranged in circle pattern. The lateral side 57 of the roller stage 51 has a clamping means corresponding to the positioning holes 62. The clamping means comprises a ball mount 58, a through hole 59 on the sidewall of the ball mount 58, a rolling ball 8 mounted on the through hole 59 with partially exposed portion, at least two blocking flanges 50 on outer sides of the lateral side 57 of the roller stage 51. The blocking flanges 50 function to lock a block plate 81 which retain the outer surface of the rolling ball 8 such that the ball 8 exposes inward and clamp the positioning holes 62. The number of the ball 8 can be more than one to clamp the positioning holes 62 such that the roller 6 will not further rotate and the third-axis cursor can be fixed. The positioning holes 62 are circle holes of equal distance or equal-distance corrugations in radial distribution.

The roller 6 comprises a case 66 and a rubber wheel roller 67 with inner convex part engaged with the concave part of the case 66. The rubber wheel 67 has a plurality of equal-distance dents 68 on the rim thereof to enhance the tactile feeling of user and manipulation of roller 6.

The roller 6 has an opened lateral side containing an optical means 7. The optical means 7 has a case 71 arranged the accommodation space within the roller 6. The case 71 has a lock plate 72 on outer surface thereof and engaged between two locking plates 55. The case 71 has a circuit board 74 on the inner side thereof and has an infrared transceiver 75 corresponding to a ring 64 of the roller 6. The circuit board 74 is electrically connected to the primary circuit board 43. More particularly, the infrared transceiver 75 is mounted on the circuit board 74 and has a receiver on inner part thereof and a transmitter on outer part thereof. The light emitted from the transmitter is refracted by the tooth pattern 65 on the ring 64 of the roller 6 and is detected by the receiver, thus generating signal corresponding to key switch operation.

When user press the roller 6, the pivot shaft 56 of the roller stage 51 linked with the roller 6 touches the micro switch 9 to activate the third axis input. The roller stage 51 lays against the pole 47 hooked by the elastic member 48. The elastic member 48 produces a rebound force and buffers the pressing force.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A clamping device for a third-axis input device of a mouse, said third-axis input device has a hollow roller stage and a roller pivotally mounted on the roller stage and having a plurality of positioning holes; the clamping device being mounted on one lateral side of said roller stage and comprising at least one ball mount on said lateral side;
a through hole on the sidewall of said ball mount;
a rolling ball mounted on said through hole with partially exposed portion;
at least one blocking flange on outer sides of said lateral side;
a block plate locked by said blocking flange and used to retain said rolling ball such that said rolling ball is positioned within one positioning hole to confine the rotation of said roller.

2. The clamping device for a third-axis input device of a mouse as in claim 1, wherein said roller stage has two pivot rods on front side thereof and pivotally engaged with two pivot holes on front side of the base plate of said mouse.

3. The clamping device for a third-axis input device of a mouse as in claim 1, wherein said positioning holes are holes with equal separation.

4. The clamping device for a third-axis input device of a mouse as in claim 1, wherein said positioning holes are corrugations with equal separation.

5. The clamping device for a third-axis input device of a mouse as in claim 4, wherein said corrugations are in radial distribution.

* * * * *